(12) United States Patent
Maeda et al.

(10) Patent No.: US 6,683,769 B2
(45) Date of Patent: Jan. 27, 2004

(54) PROTECTIVE RELAY APPARATUS

(75) Inventors: Daisuke Maeda, Hitachi (JP); Takashi Funawatari, Hitachi (JP); Yoshiyasu Watanabe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/247,340

(22) Filed: Sep. 20, 2002

(65) Prior Publication Data

US 2003/0072114 A1 Apr. 17, 2003

Related U.S. Application Data

(63) Continuation of application No. 09/942,691, filed on Aug. 31, 2001.

(30) Foreign Application Priority Data

Mar. 1, 2001 (JP) ........................................ 2001-056995

(51) Int. Cl.⁷ ................................................ H02H 3/00
(52) U.S. Cl. ........................ 361/93.2; 361/78; 361/93.1
(58) Field of Search .............................. 361/93.1, 93.2, 361/93.3, 78, 115

(56) References Cited

U.S. PATENT DOCUMENTS

| | | | | | |
|---|---|---|---|---|---|
| 3,815,011 | A | * | 6/1974 | Milkovic | 323/357 |
| 3,995,210 | A | * | 11/1976 | Milkovic | 323/358 |
| 4,259,706 | A | * | 3/1981 | Zocholl | 361/96 |
| 5,293,295 | A | * | 3/1994 | Nishitani | 361/63 |

* cited by examiner

Primary Examiner—Stephen W. Jackson
(74) Attorney, Agent, or Firm—Mattingly, Stanger & Malur, P.C.

(57) ABSTRACT

Compatibility with a current transformer having several kinds of rated current ratios is achieved by finding out a formula of relationship between errors arising in a transformer input circuit and detectable ranges set as setting values of the input circuits which can be optimally set. In connection with that, by dispensing with a gain control section, the number of components, the mounting area and the cost can be reduced. Arithmetic expressions representing the relationship among errors arising in the transformer input circuit, the instrumentation ranges of the input circuits, and detectable errors have been derived. Further by optimally setting the detectable ranges of the input circuits, which are the parameters of the arithmetic expressions, the configuration compatible with a current transformer having several kinds of rated current ratios is achieved.

7 Claims, 13 Drawing Sheets

FIG. 12

| 50 | Ir | OPERATING CURRENT | 1.2A |
|---|---|---|---|
|  |  | OPERATING TIME | 0.05ms' |
|  | Is' | OPERATING CURRENT | 1.7A |
|  |  | OPERATING TIME | 0.02ms |
|  |  |  | ⋮ |
| CT SETTING | TYPE | — | 600A |
|  | PRIMARY VALUE | — | 40A |

154

SEND | RESET | CANCEL

PROTECTIVE RELAY APPARATUS

This is a continuation application of U.S. Ser. No. 09/942,691, filed Aug. 31, 2001.

BACKGROUND OF THE INVENTION

The present invention relates to a protective relay apparatus and a power switchboard.

Conventional protective relay apparatus and power switchboard are configured of protection/instrumentation control units for converting current or voltage signals delivered from a transformer having several kinds of primary rated current ratios or one kind of primary rated voltage ratio into appropriate voltage signals by using a gain control section in front of an operational amplifier and for subjecting them to operational processing after A/D conversion.

The conventional art cited above involves the problem in that detectable errors within the detectable range of protection and instrumentation cannot be assessed on account of a relationship taking account of a detectable range of an input circuit for inputting an analog current or voltage signal and errors of transformer input circuits, and a current signal or a voltage signal, which is transmitted from the transformer, is assigned to each input circuit.

While there was the gain control section in front of the operational amplifier to be compatible with a transformer having several kinds of rated current or voltage ratios, there also was the further problem that this gain control section not only was expensive but also required a large mounting area.

SUMMARY OF THE INVENTION

To solve the above-mentioned problems, it is an object of the present invention to provide a protective relay apparatus and a power switchboard which are capable of detecting a current or a voltage without a gain control section in front of an operational amplifier.

To accomplish the object, according to a first aspect of the present invention, there is provided a protective relay apparatus having a transformer for outputting a detection signal in accordance with the varying current or voltage of a main circuit and a control unit for determining that the main circuit is in a predetermined state by using the detection signal and outputting a control signal for switching on/off the main circuit, comprising: an input circuit comprising an operational amplifier for inputting the detection signal and an A/D converter for A/D converting an output signal from the operational amplifier; control means for inputting an output signal from the input signal, determining that the main circuit is in the predetermined state, and outputting a control signal for switching on/off the main circuit; and means comprising a plurality of the input circuits, for setting detectable ranges of the plurality of input circuits for each of the plurality of input circuits.

Further, according to a second aspect of the present invention, there is provided a protective relay apparatus having a transformer for outputting detection signals in accordance with the varying current or voltage of a main circuit, an input circuit comprising an operational amplifier for inputting the detection signal and an A/D converter for A/D converting an output signal from the operational amplifier, and a control unit for inputting an output signal from the input signal, determining that the main circuit is in the predetermined state, and outputting a control signal for switching on/off the main circuit, comprising: setting means for setting a detectable range of the input circuit, wherein the setting means displays a detection state of the input circuit based on a relationship between the detectable range of the input circuit and a detectable error.

Furthermore, according to a third aspect of the present invention, there is provided a protective relay apparatus having a transformer for outputting a detection signal in accordance with the varying current or voltage of a main circuit, an operational amplifier for inputting the detection signal, an input circuit having an A/D converter for A/D converting an output signal from the operational amplifier and a control unit for inputting an output signal from the input signal, determining that the main circuit is in the predetermined state, and outputting a control signal for switching on/off the main circuit, comprising: setting means for setting a detectable range of the input circuit, wherein the setting means displays the detection state of the input circuit based on a relationship between the detectable range of the input circuit and a reference value of a detectable error.

In addition, according to a fourth aspect of the present invention, there is provided a protective relay apparatus having a transformer for outputting a detection signal in accordance with the varying current or voltage of a main circuit and a control unit for determining that the main circuit is in a predetermined state by using the detection signal and outputting a control signal for switching on/off the main circuit, comprising: a first input circuit comprising a first operational amplifier for inputting the detection signals and an A/D converter for A/D converting an output signal from the first operational amplifier; and a second input circuit comprising a second operational amplifier for inputting the detection signal, which has gain characteristics compatible with wide range detection permitting detection in a wide varying range of a current or a voltage, as compared with the first operational amplifier, and an A/D converter for A/D converting an output signal from the second operational amplifier, wherein each of the first and second circuits comprises means for setting the detectable range thereof, and the detectable ranges are figured out by an arithmetic expression on the basis of the magnitude of the error of each of the first and second input circuits, resolving power of the A/D converter, and the tolerable detectable errors of the instrumentation.

According to the present invention, by using the above-mentioned means, it is possible to provide compact, lightweight and inexpensive protective relay apparatus and power switchboard which are improved in accuracy of instrumentation.

To accomplish the object, for the purpose of evaluating detectable errors within the detectable range of protection and instrumentation, the present invention has derived an arithmetic expression having, as its parameters, the magnitude of any error of a transformer input circuit or a current transformer input circuit, a resolving power of the A/D converter, an effective amperage (voltage) and the detectable range of the transformer input circuit or the current transformer input circuit containing the operational amplifiers.

Further, by setting the detectable range of the input circuit containing the operational amplifiers, which is a parameter of the arithmetic expression, the configuration is made compatible with a transformer having several kinds of rated current ratios or rated voltage ratios and one kind of primary rated current ratio or primary rated voltage ratio.

This makes it possible to manufacture a transformer which can have several kinds of rated current ratios or rated voltage ratios and a protective relay apparatus and a power switch board compatible with the current transformer.

BRIEF DESCRIPTION OF THE DRAWINGS

FIG. 12 is a diagram showing another display example of the screen of the personal computer when the setting values are set by using the personal computer, in the protective relay apparatus or the power switchboard according to the embodiment of the present invention;

DESCRIPTION OF THE PREFERRED EMBODIMENTS

Hereinbelow, an embodiment of the invention will be described with reference to the drawings.

Figure 1:
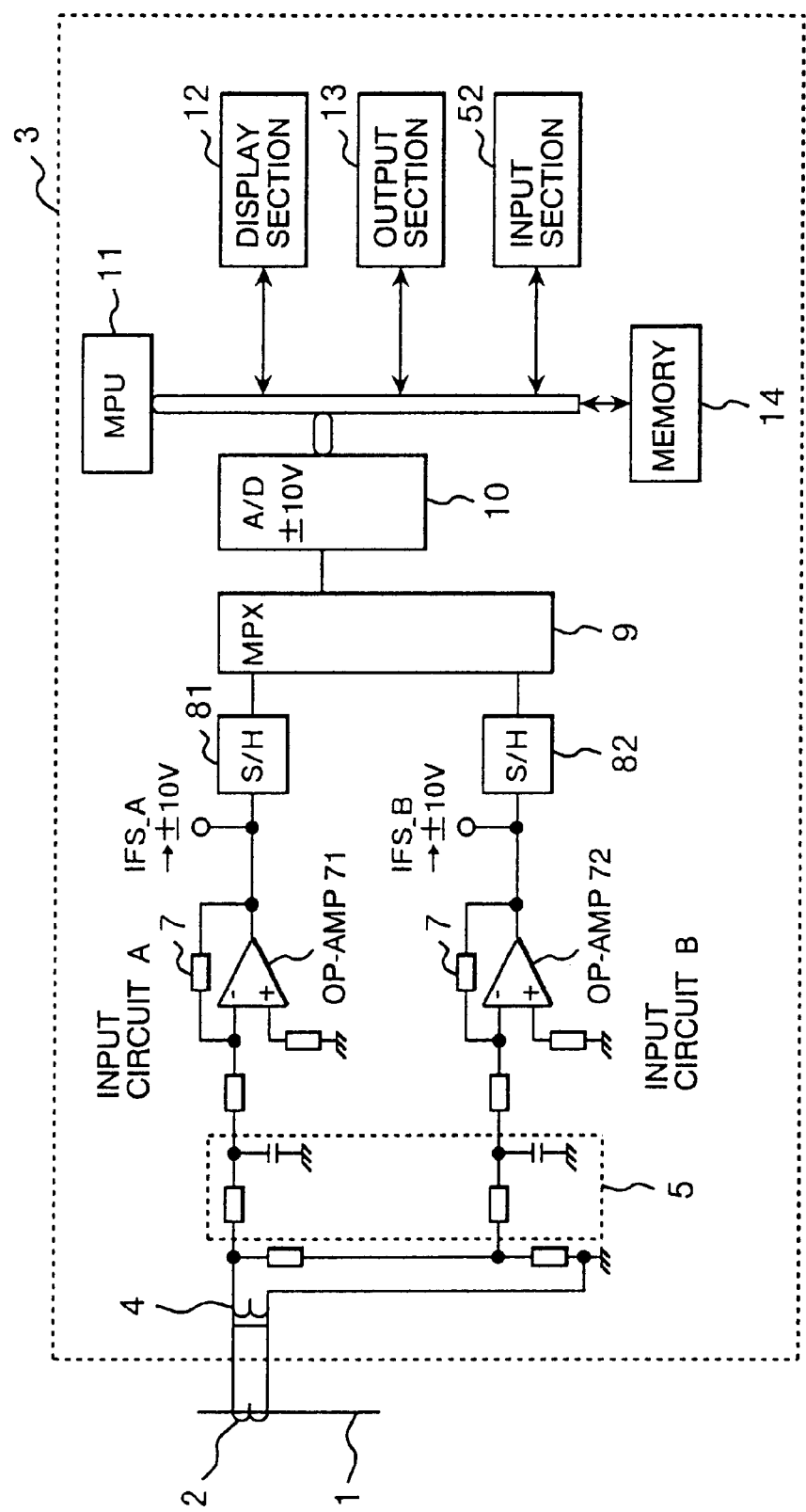
FIG. 1 is a diagram illustrating the configuration of a protection/instrumentation control unit and a current transformer according to an embodiment of the present invention.

FIG. 1 is a diagram illustrating the configuration of a protective relay apparatus comprising a protection/instrumentation control unit 3 and a current transformer according the embodiment of the present invention.

A detection signal of a current or a voltage is inputted to a transformer input circuit from a main circuit 1. This transformer input circuit is usually configured of a transformer 2, an auxiliary transformer 4, a filter circuit 5, operational amplifiers 71 and 72, sample holding circuits 81 and 82, a multiplexer 9, and an analog/digital converter (A/D converter) 10 for converting an analog signal into a digital signal. Hereinbelow, the transformer input circuit is simply referred to as an input circuit. The input circuit allows an analog current or voltage detection signal to be finally inputted to a control circuit as a digital signal.

The current or voltage detection signals inputted by the transformer 2, which are transmitted from the main circuit 1, are inputted to the auxiliary transformer 4, and thereafter are converted to a suitable level. These level-converted detection signals, after being cleared by the filter circuit 5 of harmonics unnecessary for arithmetic operation for protection and instrumentation, are inputted to the operational amplifiers 71 and 72 for converting current signals into voltage signals. The detection signals delivered from the operational amplifiers 71 and 72 are sampled at prescribed intervals of time and held for a prescribed length of time by the sample holding circuits 81 and 82. The multiplexer 9 outputs what results from selective switching of these analog values inputted by the sample holding circuits 81 and 82 at prescribed intervals of time.

These analog values are converted by the A/D converter 10 into digital signals. A processing unit MPU (hereinafter, referred to as an MPU) 11 carries out protection/instrumentation control by processing the digital signals resulting from conversion by the A/D converter 10. A display section 12 displays the instrumentation result of processing by the MPU 11 by using various display equipment. According to the embodiment, the display section 12 comprises a seven-segment LED/LCD display and a pilot lamp indicating a status thereof as display means.

Figure 5:
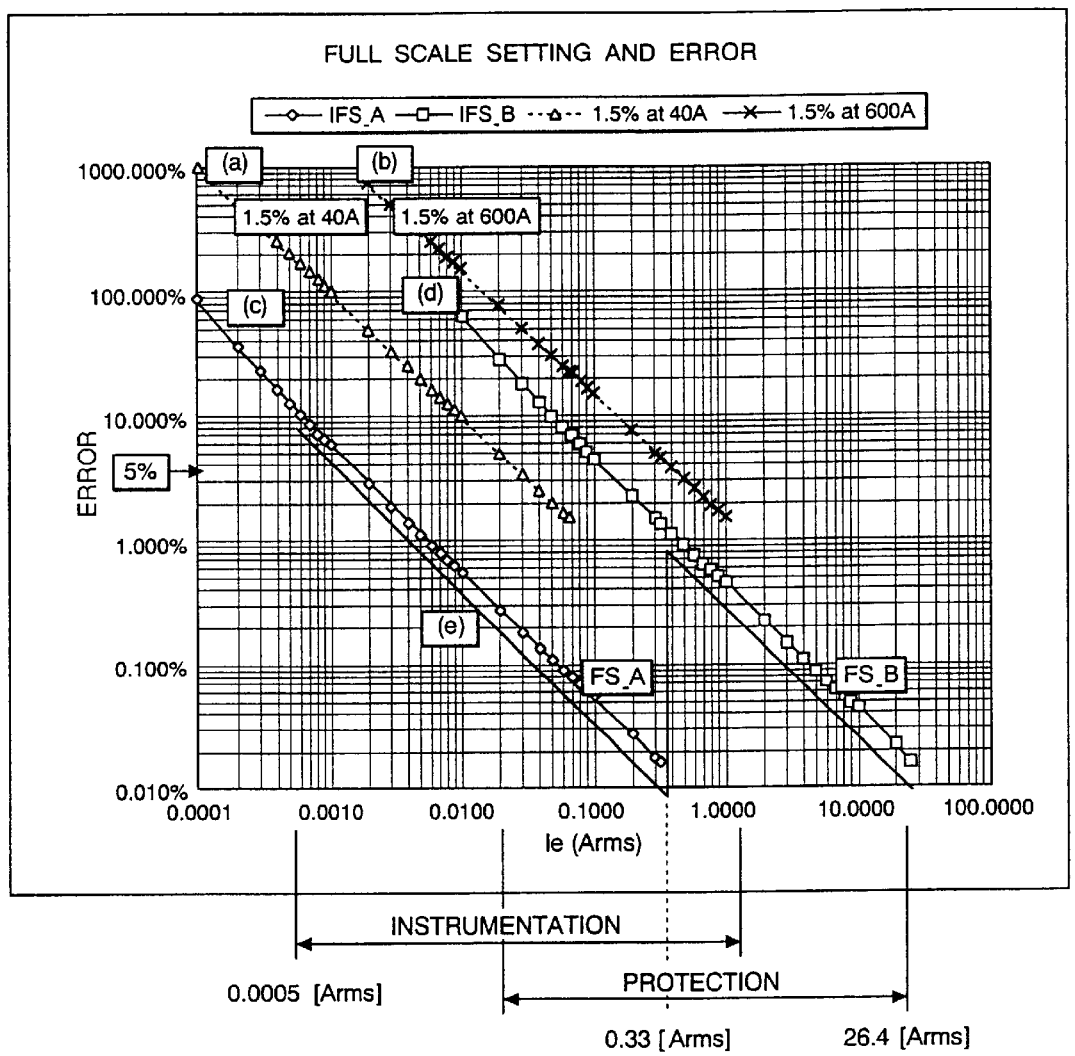
FIG. 5 is a diagram showing the relationship of detectable errors to the effective amperage by using a 600 A-type multi-current transformer according to the embodiment of the present invention.

The MPU 11, on the basis of the result of processing thereof, determines whether or not the result surpasses a prescribed value, for example, a current larger than the detectable range of the protection and instrumentation shown in FIG. 5, and, if it does, outputs a tripping instruction to a circuit breaker 15 via an output circuit 13, thus switching on/off the main circuit 1.

Figure 2:
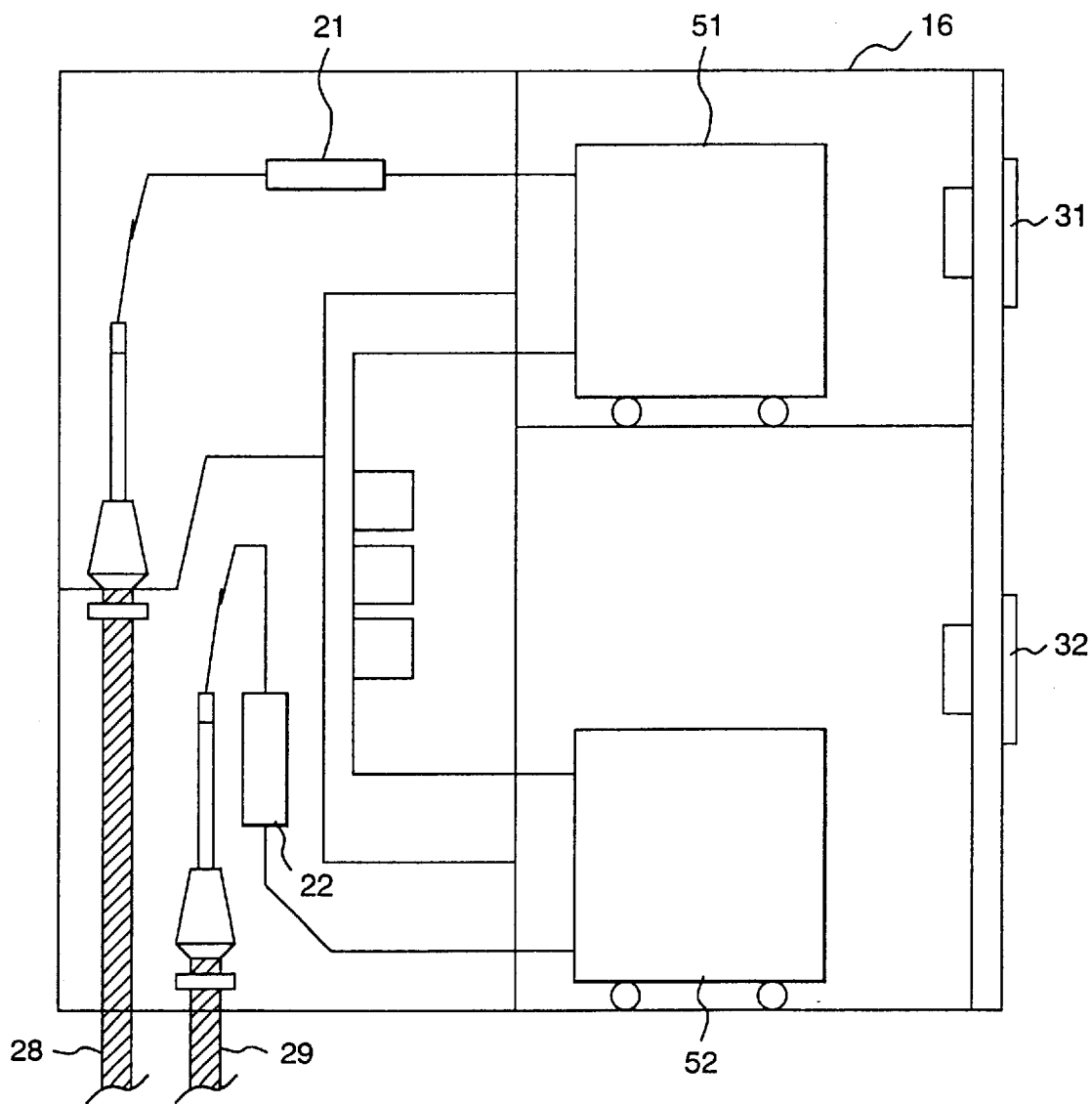
FIG. 2 is a diagram illustrating the configuration of a power switchboard according to the embodiment of the present invention.

FIG. 2 illustrates the configuration of a power switchboard 16 having the protective relay apparatus of the present invention, in which two sets of the configuration of the transformer and the protective relay apparatus comprising the protection/instrumentation control unit as shown in FIG. 1 are arranged, according to the embodiment of the present invention.

Voltage and current information from main circuits 28 and 29 are inputted to protection/instrumentation control units 31 and 32 via transformers 21 and 22. Circuit breakers 51 and 52 switches on/off the main circuits 28 and 29 in response to instructions from the protection/instrumentation control units 31 and 32.

Figure 3:
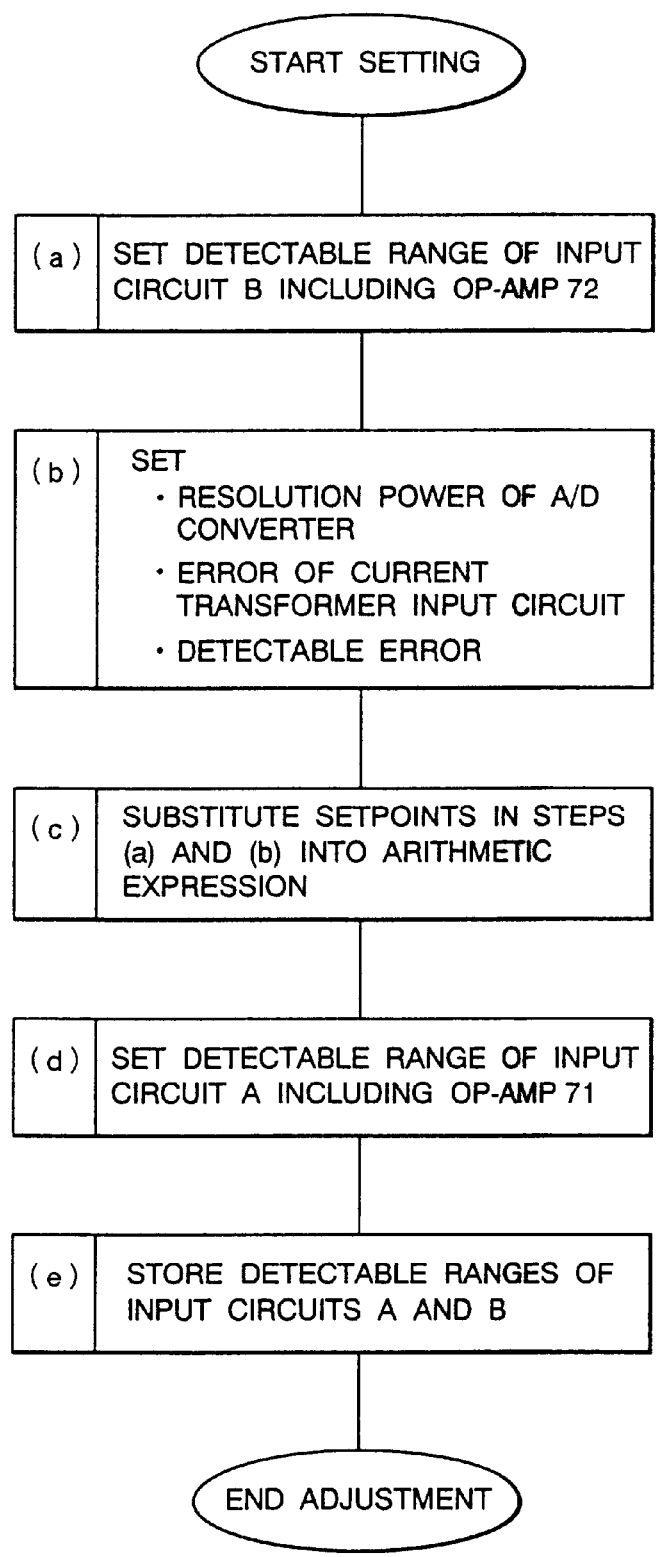
FIG. 3 is a chart of a flow until detectable ranges are set, according to the embodiment of the present invention.

FIG. 3 is a chart of a flow until the detectable ranges of the input circuits containing operational amplifiers 71 and 72 shown in FIG. 1 are derived and set according to the embodiment of the present invention.

FIG. 5 is a logarithmic graph showing the relationship of detectable errors to an instrumented amperage by introducing, into the arithmetic expression, which will be described later, parameters obtained in accordance with the flow of FIG. 3 including the detectable ranges of the input circuits, according to the embodiment, in which the abscissa designates an amperage and the ordinate designates an error. The graph shown in FIG. 5 is used for checking whether characteristics derived from the arithmetic expression, which will be described later, are within the tolerable errors of the instrumentation range or within the tolerable errors of the protection range.

Line (a) in graph of FIG. 5 represents conversion of the tolerance of the instrumentation range into operational value errors when a rated primary value of a 600 A-type multi-current transformer is 40 A. Line (a) is used as the reference for determination, and the error curve should not be above line (a) in the instrumentation area.

Line (b) in graph of FIG. 5 represents conversion of the tolerance of the instrumentation range when the rated primary value of the 600 A-type multi-current transformer is 600 A. Line (b) is used as the reference for determination, and the error curve should not be above line (b) in the instrumentation area. In general, for the protective relay apparatus and the power switchboard, a tolerance detectable error of 5% is required in the instrumentation and protection areas. Therefore, the error curve should be not above the tolerance detectable error of 5% within the overall of the instrumentation and protection ranges as shown in FIG. 5.

Line (c) in graph of FIG. 5 represents an error curve of the input circuit containing the operational amplifier 71 compatible with detection of a low current, which is obtained by the following arithmetic expression.

Line (d) in graph of FIG. 5 represents an error curve of the input circuit containing the operational amplifier 72 compatible with detection of a high current, which is obtained by the following arithmetic expression.

The method of setting and calculating the detectable range will be described below with reference to FIGS. 3 and 5.

Referring to FIG. 3, in step (a), a value with a margin for the maximum value of detected currents out of the required detectable range of protection and instrumentation is within the detectable range of the input circuit B including the operational amplifier 72 (compatible with high current detectable range is set to be 26.4 [Arms].

In step (b), a partial voltage value inputted to the operational amplifier 72, gain of the operational amplifier 72, the resolving power of the A/D converter 10, etc. are set within the range of the tolerance detectable error (b) in FIG. 5.

In step (c), by substituting the setpoints in steps (a) and (b), which are the parameters, in the arithmetic expression stated in the later explanation of arithmetic expressions, line (d) in FIG. 5 showing the error to the detected current of the input circuit B can be figured out. Since the protection needs the instrumentation of the detected current within the instrumentation error level of 5% or less, in the detected current values at the crossing point between line (d) as characteristics and the error 0.5%, i.e., in the graph of FIG. 5, a lower limit value of the current values detected by the input circuit B is approximately 0.1 [Arms].

In step (d), an input circuit A detects current values which are equal to or less than the lower limit value of approximately 0.1 [Arms]. An upper limit value within the detectable current range of the input circuit A is 0.33 [Arms] with tolerance, much greater than the current value of approximately 0.1 [Arms] obtained in the step (c). That is, the detectable current range of the input circuit A is overlapped to that of the input circuit B. By substituting the setpoints, which are the parameters, in the arithmetic expression stated in the later explanation of arithmetic expressions in the manners similar to those in steps (b) and (c), line (c) in FIG. 5 showing the error to the detected current of the input circuit A can be figured out.

In step (e), the detectable current ranges of the input circuits A and B figured out in steps (a) and (d) are stored into the memory 14. The MPU 11 performs the control and determination by referring to the detectable ranges while switching the outputs based on the input current and voltage values.

By setting the detectable current values, the tolerances of lines (a) and (b) in FIG. 5 are satisfied within the instrumental range of 0.0005 to approximately 1.5 [Arms]. The tolerance range of 5% is satisfied within the protection range of approximately 0.02 to 26.4 [Arms]. The memory 14 stores therein the detected current values 0.0005, 0.33, and 26.4 [Arms] to switch the outputs of the input circuits A and B at 0.33 [Arms], shown in FIG. 5, and the input circuits A and B instrument the current values in accordance with the change in the detected current values. Line (e) in FIG. 5 shows the protection and instrumentation within the overall ranges of the instrumentation and protection.

For the input circuits A and B, the ranges of the instrumentation and the protection are divided based on the detected result, to cover the instrumentation current range and reduce the instrumentation errors as much as possible, thus performing the instrumentation and the control at high accuracy.

By setting the detectable current ranges of the input circuits A and B in the chart of the flow in FIG. 5, the current transformer having several kinds of primary rated current ratios can be achieved.

As the foregoing reveals that the detectable current range of the 600 A-type multi-current transformer is included in the error tolerance required within the detectable current range of protection and instrumentation, it can be confirmed that the performance requirements are satisfied. Therefore these detectable ranges are stored into the memory 14 as the setting values. The individual usage of the input circuits A and B for the protection and instrumentation is permitted, while holding the instrumentation accuracy depending on the amperage [Arms] as target.

Lines (a) to (e) in FIG. 5 can be displayed by display means provided for the display section 12, and be displayed by an external personal computer connectable via a communication port.

The error curve of the detected current and voltage can be derived by introducing the setpoints into the respective parameters of arithmetic expressions (1–16), which will be described later. The parameters to be set and the arithmetic operating steps are given below.

D: Resolving power of the A/D converter 10 (e.g. 12 bits, 14 bits)

x: Magnitude of error (e.g. 0, 5, 1, 2 . . . )

IFS: Detectable range setting (see FIG. 3)

A description is given of lines (a) to (d) in the graph of FIG. 5 indicating a general example compatible with the 600 A-type multi-current transformer with reference to FIG. 3. Incidentally, the input circuit of the current transformer is supposed to be a two-input type, having the operational amplifiers 71 and 72 differing in gain characteristics from each other (range A compatible with detection of a minutely narrow range and range B compatible with detection of an extensive range). Thus, the operational amplifier 72 has gain characteristics compatible with wide range detection permitting detection in a wide varying range of a current, while the operational amplifier 71 has gain characteristics compatible with narrow range detection permitting detection in a narrow varying range of a current.

Line (a) is a graph representing conversion of the tolerance of the instrumentation range when the rated primary value of the 600 A-type multi-current transformer is 40 A. Line (a) is used as the reference for judgment, and the error curve should not be above line (a) in the instrumentation area.

Line (b) is a graph representing conversion of the tolerance of the instrumentation range when the rated primary value of the 600 A-type multi-current transformer is 600 A. Line (b) is used as the reference for judgment, and the error curve should not be above line (b) in the instrumentation area.

Line (c) is the result of the following setting of the parameters of the arithmetic expressions (1–16) on the error curve of range A.

D: Resolving power of the A/D converter 10=14 bits
x: Magnitude of error of the current transformer input circuit=2 LSB (Least Significant Bit),
IFS: Full scale setting IFS_A=0.33 A It is seen from this diagram that the above-stated setpoints can satisfy the performance requirements because line (c) is not above line (a) or (b) within the instrumentation area and not above the detectable error of 5% (required value) in the protection area.

Line (d) is the result of the following setting of the parameters of the arithmetic expressions (1–16) on the error curve of range B.

D: Resolving power of the A/D converter 10=14 bits
x: Magnitude of error of the current transformer input circuit=2 LSB (Least Significant Bit)

IFS: Detectable range setting IFS_B=26.4 A

It is seen from this diagram that the above-stated setpoints can satisfy the performance requirements because line (c) is not above line (b) within the instrumentation area and not above the detectable error of 5% (required value) in the protection area. Line (e) in FIG. 5 shows the protection and instrumentation within the overall ranges of the instrumentation and protection. And Line (e) shows the protection and instrumentation within the overall ranges of the instrumentation and protection of the input circuits A and B.

The arithmetic expressions used in the embodiment of the present invention will be explained hereinafter.

A case in which current signals delivered from the current transformer are sampled in the worst case being taken up as an example (see FIG. 4), the relationship between current detectable range (IFS) setting and errors of the current transformer input circuit is to be derived.

Figure 4:
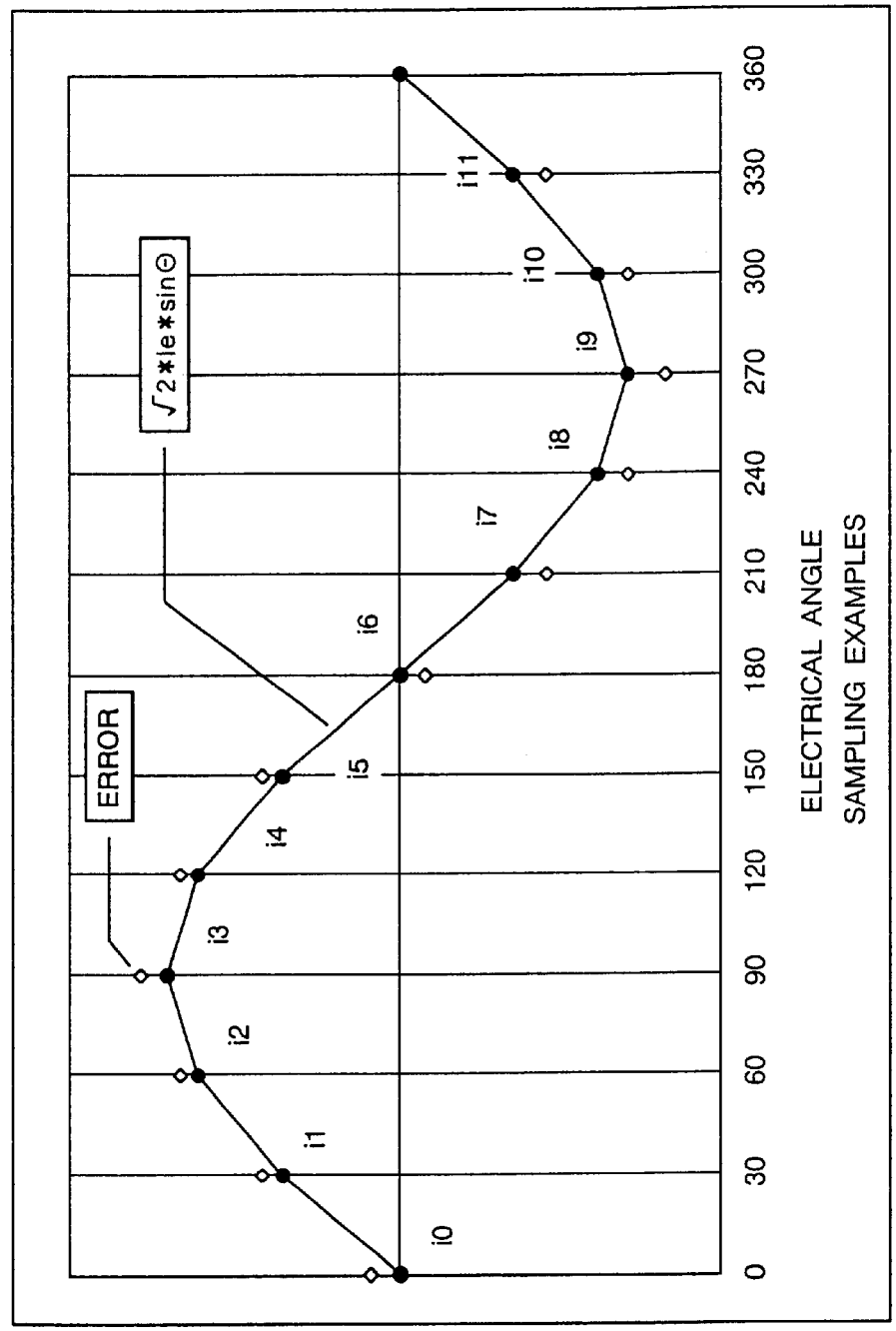
FIG. 4 is a diagram showing a waveform obtained by sampling a current waveform according to the embodiment of the present invention.

FIG. 4 shows an example of waveform obtained by sampling (at an electrical angle of 30°) a current waveform (in analog values) delivered from the current transformer with the sample holding circuits 81 and 82. At the time of sampling, any error of the current transformer input circuit may come in. The worst case is an instance in which such an error as shown in FIG. 4 arises over a full period of the current waveform.

Formula 3

(1) Amplitude computation, product system, where the number of data is 12

Arithmetic expression of effective amperage (Ic); the input error of the current transformer (A) and LSB value(B) respectively are:

$$Ie = \sqrt{\frac{1}{N}\sum_{k=0}^{N-1} i_k^2} \qquad (1\text{-}1)$$

$$B = \frac{IFS}{2^{(D-1)}} \qquad (1\text{-}2)$$

$$A = xB \qquad (1\text{-}3)$$

where:
A=Error of the current transformer input circuit
x=Magnitude of error (0, 5, 1, 2 . . . )
D=Resolving power of the A/D converter 10
Ie=Effective amperage As shown in FIG. 5, if 12 data are sampled in the worst case, Ie will be:

$$Ie' = \sqrt{\frac{1}{12}\{(i_0+A)^2 + (i_1+A)^2 + \ldots + (i_5+A)^2 + (i_6-A)^2 + (i_7-A)^2 + \ldots + (i_{11}-A)^2\}} \qquad (1\text{-}4)$$

$$Ie' = \sqrt{\frac{1}{12}\{(i_0^2+2Ai_0+A^2) + \ldots + (i_5^2+2Ai_5+A^2) + (i_6^2-2Ai_6+A^2) + \ldots + (i_{11}^2-2Ai_{11}+A^2)\}} \qquad (1\text{-}5)$$

$$Ie' = \sqrt{\frac{1}{12}\{(i_0^2+i_1^2+\ldots+i_{11}^2) + 2A(i_0+i_1+i_2+i_3+i_4+i_5-i_6-i_7-i_8-i_9-i_{10}-i_{11}) + 12A^2\}} \qquad (1\text{-}6)$$

$$Ie'^2 = \frac{1}{12}(i_0^2+i_1^2+\ldots+i_{11}^2) + \frac{2A}{12}(i_0+i_1+i_2+i_3+i_4+i_5-i_6-i_7-i_8-i_9-i_{10}-i_{11}) + A^2 \qquad (1\text{-}7)$$

Formula 4

Hereupon, from Expression (1–7):

$$Ie^2 = \frac{1}{12}(i_0^2+i_1^2+\ldots+i_{11}^2) \qquad (1\text{-}8)$$

is obtained. Expression (1–8) is substituted into Expression (1–7) to give:

$$Ie'^2 - Ie^2 = \frac{2A}{12}(i_0+i_1+i_2+i_3+i_4+i_5-i_6-i_7-i_8-i_9-i_{10}-i_{11}) + A^2 \qquad (1\text{-}9)$$

Since here is the relationship of:

$$i_0 = -i_6, i_1 = -i_7, i_2 = -i_8, i_3 = -i_9, i_4 = -i_{10}, i_5 = -i_{11} \qquad (1\text{-}10)$$

Expression (1–10) is substituted into Expression (1–9) to give:

$$Ie'^2 - Ie^2 = \frac{A}{3}(i_0 + i_1 + i_2 + i_3 + i_4 + i_5) + A^2 \quad (1\text{-}11)$$

Formula 5

Hereupon, since $$(i_0+i_1+i_2+i_3+i_4+i_5) = \int_M^\pi \sqrt{2} Ie \sin\theta d\theta = 2\sqrt{2} Ie \quad (1\text{-}12)$$

holds, Expression (1–12) is substituted into Expression (1–11) to give:

$$Ie'^2 - Ie^2 = \frac{A}{3} 2\sqrt{2}\, Ie + A^2 \quad (1\text{-}13)$$

and $$Ie' = \sqrt{Ie^2 + \frac{2\sqrt{2}\, AIe}{3} + A^2} \quad (1\text{-}14)$$

Therefore, the detectable error (1 g) will be:

$$Ig = \frac{Ie' - Ie}{Ie} \quad (1\text{-}15)$$

$$Ig = \frac{\sqrt{Ie^2 + \frac{2\sqrt{2}\, AIe}{3} + A^2} - Ie}{Ie} \quad (1\text{-}16)$$

According to this expression, the full scale set amperage can be represented by Expression (1–17).

$$IFS = \frac{2^{(D-1)} Ie}{x}\left(\sqrt{Ig^2 + 2Ig + \frac{4}{9}} - \frac{\sqrt{2}}{3}\right) \quad (1\text{-}17)$$

From the foregoing, with the resolving power of the A/D converter and the error magnitude of the current transformer input circuit as parameters, the optimal designing to satisfy the required detection accuracy can be carried out.

Based on these formulae 1 to 3, lines (c) and (d) in the graph of FIG. 5 can be obtained by inputting the instrumentation conditions of the input circuits A and B in the embodiment of the present invention.

Additionally, two similar examples will be shown below.

Formula 6

(2) Amplitude computation, product system, where the number of data is 5

Arithmetic expression of effective amperage (Ie); the input error of the current transformer (A) and LSB value (B) respectively are:

$$Ie = \sqrt{\frac{1}{N}\sum_{k=0}^{N-1} i_k^2} \quad (2\text{-}1)$$

$$B = \frac{IFS}{2^{(D-1)}} \quad (2\text{-}2)$$

$$A = xB \quad (2\text{-}3)$$

where:

A=Error of the current transformer input circuit
x=Magnitude of error (0, 5, 1, 2 . . . )
D=Resolving power of the A/D converter 10
Ie=Effective amperage As shown in FIG. 5, if 6 data are sampled in the worst case, Ie' will be:

$$Ie' = \sqrt{\frac{1}{6}\{(i_0 + A)^2 + (i_1 + A)^2 + \ldots + (i_5 + A)^2\}} \quad (2\text{-}4)$$

$$Ie' = \sqrt{\frac{1}{6}\{(i_0^2 + 2Ai_0 + A^2) + \ldots + (i_5^2 + 2Ai_5 + A^2)\}} \quad (2\text{-}5)$$

$$Ie' = \sqrt{\frac{1}{6}\{(i_0^2 + i_1^2 + \ldots + i_5^2) + 2A(i_0 + i_1 + i_2 + i_3 + i_4 + i_5) + 6A^2\}} \quad (2\text{-}6)$$

$$Ie'^2 = \frac{1}{6}(i_0^2 + i_1^2 + \ldots + i_5^2) + \frac{2A}{6}(i_0 + i_1 + i_2 + i_3 + i_4 + i_5) + A^2 \quad (2\text{-}7)$$

Formula 7

Hereupon, from Expression (2-1):

$$Ie^2 = \frac{1}{6}(i_0^2 + i_1^2 + \ldots + i_5^2) \quad (2\text{-}8)$$

is obtained. Expression (2–8) is substituted into Expression (2–7) to give:

$$Ie'^2 - Ie^2 = \frac{2A}{6}(i_0 + i_1 + i_2 + i_3 + i_4 + i_5) + A^2 \quad (2\text{-}9)$$

$$Ie'^2 - Ie^2 = \frac{A}{3}(i_0 + i_1 + i_2 + i_3 + i_4 + i_5) + A^2 \quad (2\text{-}10)$$

Since here the relationship of:

$$(i_0 + i_1 + i_2 + i_3 + i_4 + i_5) = \int_0^\pi \sqrt{2}\, Ie\sin\theta d\theta = 2\sqrt{2}\, Ie \quad (2\text{-}11)$$

holds, Expression (2–11) is substituted into Expression (2–10) to give:

$$Ie'^2 - Ie^2 = \frac{A}{3} 2\sqrt{2}\, Ie + A^2 \quad (2\text{-}12)$$

$$Ie' = \sqrt{Ie^2 + \frac{2\sqrt{2}\, AIe}{3} + A^2} \quad (2\text{-}13)$$

are obtained. Therefore, the detectable error (Ig) will be:

$$Ig = \frac{Ie' - Ie}{Ie} \quad (2\text{-}14)$$

$$Ig = \frac{\sqrt{Ie^2 + \frac{2\sqrt{2}\, AIe}{3} + A^2} - Ie}{Ie} \quad (2\text{-}15)$$

According to this expression, the full scale setpoint can be represented by Expression (2–16).

$$IFS = \frac{2^{(D-1)}Ie}{x}\left(\sqrt{Ig^2 + 2Ig + \frac{4}{9}} - \frac{\sqrt{2}}{3}\right) \quad (2\text{-}16)$$

Formula 8

(3) Amplitude computation, addition system, where the number of data is 6

Arithmetic expression of effective amperage (Ic); the input error of the current transformer (A) and LSB value (B) respectively are:

$$|Ie| = \frac{1}{N}\sum_{k=0}^{N-1}|i_k| \quad (3\text{-}1)$$

$$B = \frac{IFS}{2^{(D-1)}} \quad (3\text{-}2)$$

$$A = xB \quad (3\text{—}3)$$

where:

A=Error of the current transformer input circuit
x=Magnitude of error (0, 5, 1, 2 . . . )
D=Resolving power of the A/D converter 10
Ie=Effective amperage As shown in FIG. 5, if 6 data are sampled in the worst case, Ie' will be:

$$Ie' = \frac{1}{6}\{(i_0 + A) + (i_1 + A) + \ldots + (i_5 + A)\} \quad (3\text{-}4)$$

$$Ie' = \frac{1}{6}(i_0 + i_1 + \ldots + i_5) + A \quad (3\text{-}5)$$

Formula 9

Hereupon, since:

$$Ie = \frac{1}{6}(i_0 + i_1 + \ldots + i_5) \quad (3\text{-}6)$$

derives from Expression (3-1), Expression (3–6) is substituted into Expression (3–5) to give:

$$Ie' - Ie = A = xB = \frac{xIFS}{2^{(D-1)}} \quad (3\text{-}7)$$

Therefore, the detectable error (Ig) will be:

$$Ig = \frac{Ie' - Ie}{Ie} \quad (3\text{-}8)$$

and $$Ig = \frac{A}{Ie} \quad (3\text{-}9)$$

According to this expression, the full scale setpoint can be represented by Expression (3–10).

$$IFS = \frac{Ig Ie 2^{(D-1)}}{x} x \quad (3\text{-}10)$$

To add, by replacing the mentions of current in the foregoing Expression (3–10) with those of voltage, the following expression of the full scale setpoint regarding voltage will hold.

Formula 10

Arithmetic expression:

$$VFS = \frac{2^{(D-1)}Ve}{x}\left(\sqrt{Vg^2 + 2Vg + \frac{4}{9}} - \frac{\sqrt{2}}{3}\right)$$

Vg=Detected error
x=Magnitude of error of the voltage transformer input circuit (0, 5, 1, 2 . . . )
D=Resolving power of the A/D converter 10
Ve=Effective voltage
VFS=Full scale value Hereinbelow, a description is given of operations for setting conditions of the input circuits A and B according to the embodiment of the present invention.

Figure 6:
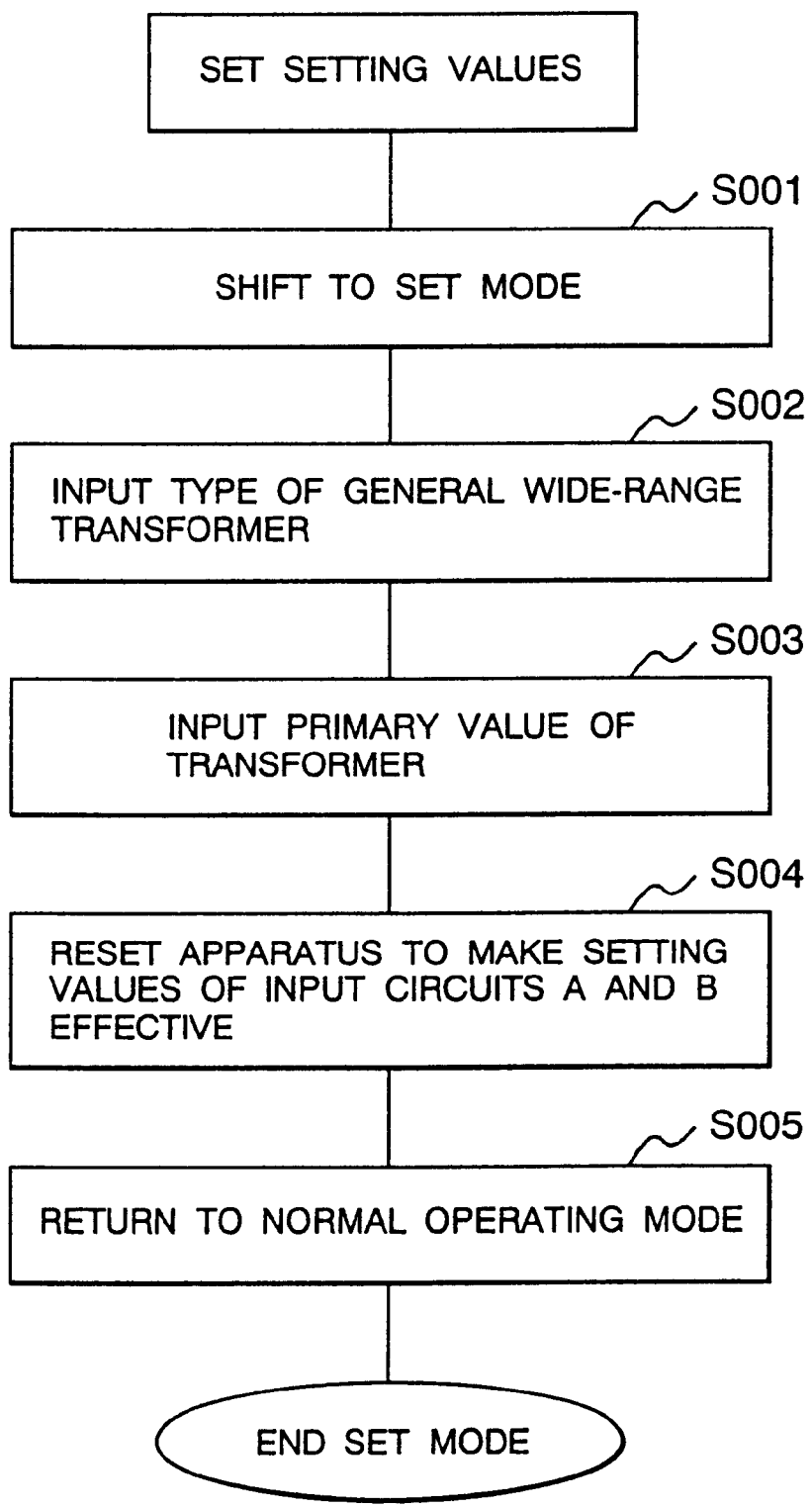
FIG. 6 is a chart of a flow until setting values of the protective relay apparatus or the power switchboard, which are set, according to the embodiment of the present invention.
Figure 7A:
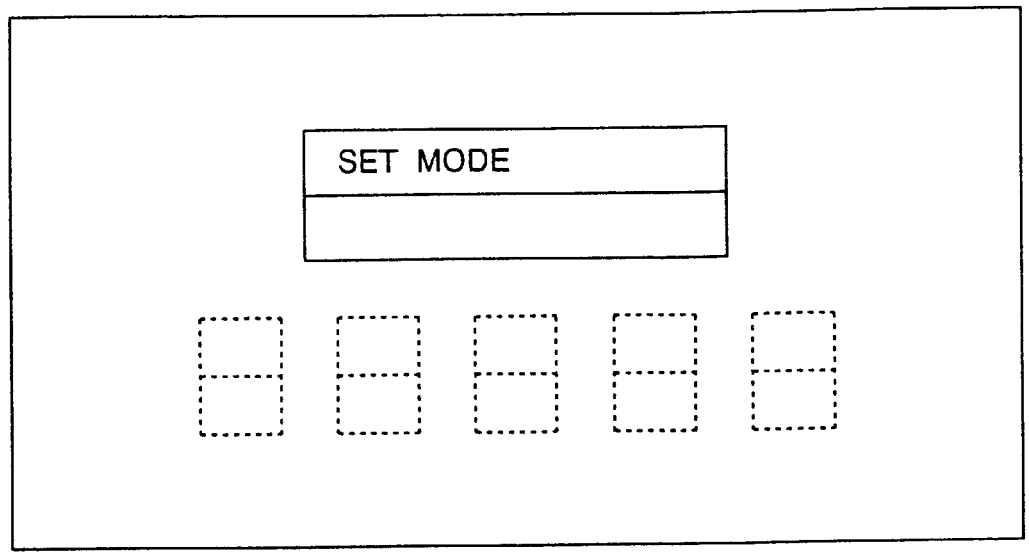
FIG. 7A is diagram showing one display screen of the protective relay apparatus.
Figure 7B:
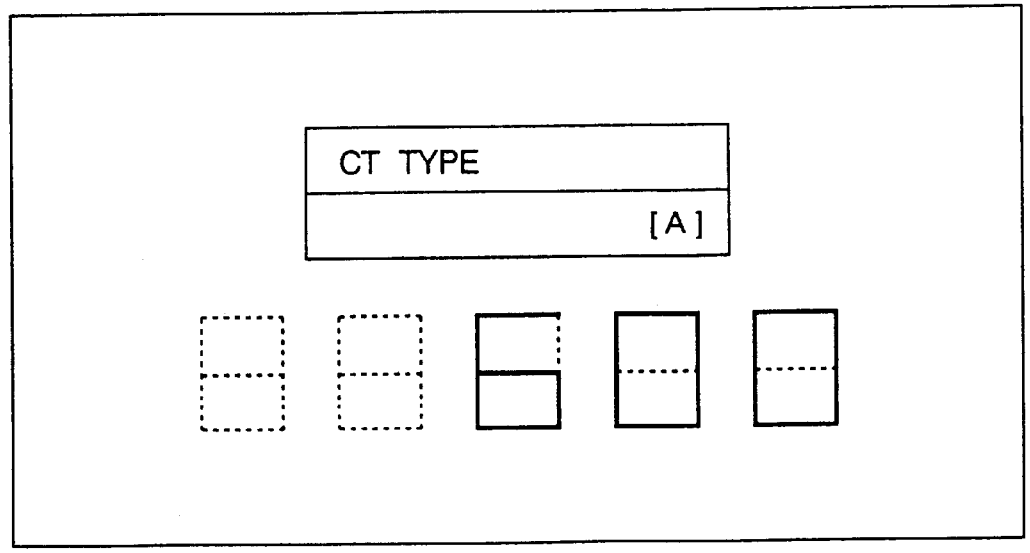
FIG. 7B is a diagram showing one display screen of the power switchboard, when the setting values of the protective relay apparatus and the power switchboard are set, according to the embodiment of the present invention.
Figure 8A:
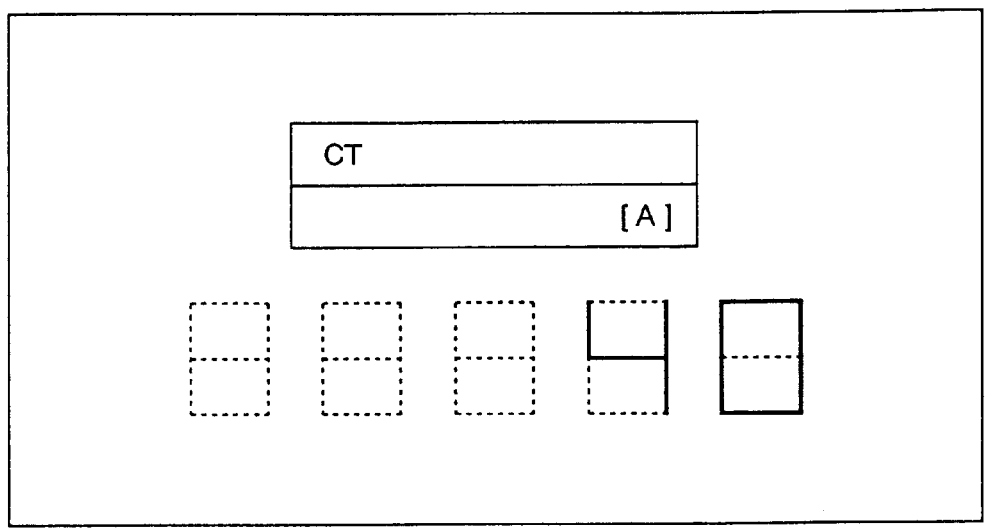
FIG. 8A is a diagram showing another display screen of the protective relay apparatus.
Figure 8B:
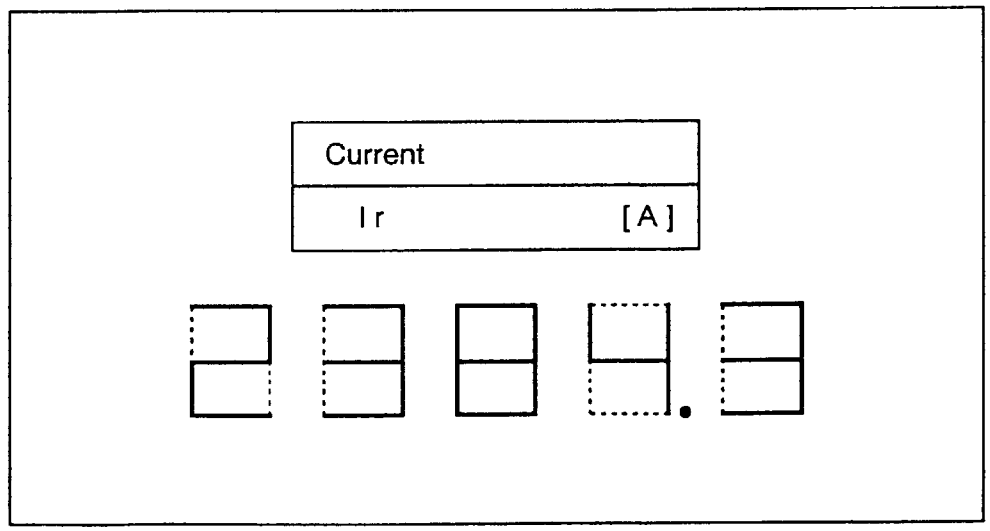
FIG. 8B is a diagram showing another display screen of the power switchboard, when the setting values of the protective relay apparatus and the power switchboard are set, according to the embodiment of the present invention.

FIG. 6 is a chart of a flow until setting the setting values, and FIGS. 7A and 8B show display statuses of FIG. 6. A setting method of the setting values will be described with reference to FIGS. 6 to 8.

In step S001, the protective relay apparatus shifts to a mode for setting, the setting values of the input circuits A and B (hereinafter, simply referred to as a set mode) by using a switch (not shown) provided for the input section 52. Thus, the MPU 11 recognizes a standby mode for inputting the setting values. FIG. 7A shows a display screen after shifting to the set mode. The display section 12 comprises a 7-segment LED having an LCD display section provided at the top thereof which indicates the set mode at the present.

In step S002, for the purpose of inputting the type of a general wide-range transformer to be used by the input circuits A and B, the protective relay apparatus status shifts to a mode for inputting the type of the transformer by using an input switch (not shown). FIG. 7B shows a display screen for inputting the corresponding type. According to the embodiment, the 600 A-type multi-current transformer is shared with the input circuits A and B.

In step S003, similarly to step S002, the protective relay apparatus shifts to a mode for inputting a primary value of the transformer, whereupon the primary value is inputted. FIG. 8A shows a display screen for inputting the primary value. The primary value of the transformer is inputted by using a keyboard arranged to the input section 52, alternatively, by using the switch arranged to the input section 52 when the primary value is predetermined.

In step S004, after completing the operation for setting the conditions of the setting values, the protective relay apparatus is reset to make the setting values effective. The MPU 11 reads the setting values stored in the memory 14, and sets the detectable ranges, as the setting values, which are used as instrumentation and protective areas of the input circuits A and B, in accordance with the above arithmetic expressions.

In step S005, the Set mode returns to a normal operating mode (mode for protection, instrumentation, and monitoring). FIG. 8B shows a display screen of the normal operating mode. In step S006, the operation in the set mode ends.

By executing the setting for the input circuits A and B in steps S001 to S005, the operation of the protective relay apparatus can be detected with high accuracy even when the general wide-range transformer is used.

Hereinbelow, a description is given of a case in which the conditions of setting values are set to the input circuits A and B by using a personal computer which is externally connected to the protection/instrumentation control unit 3, according to the embodiment of the present invention.

Figure 9:
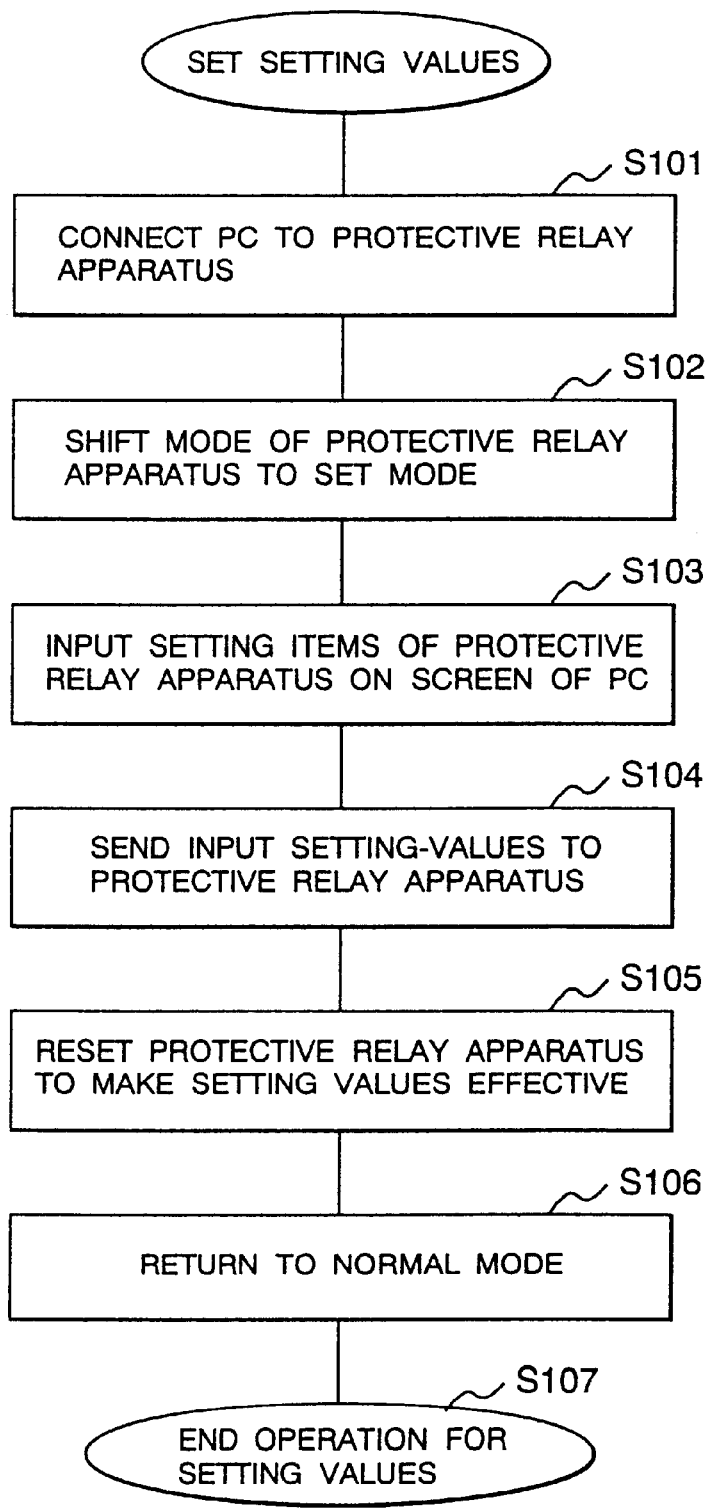
FIG. 9 is a chart of a flow when setting the setting values by using a personal computer in the protective relay apparatus or the power switchboard according to the embodiment of the present invention.

FIG. 9 shows a chart of a flow until the setting values are set, and FIGS. 10 to 14 show the configuration of the protective relay apparatus in FIG. 9. Hereinbelow, the setting method of the setting values will be described with reference to FIGS. 10 to 14.

Figure 10:
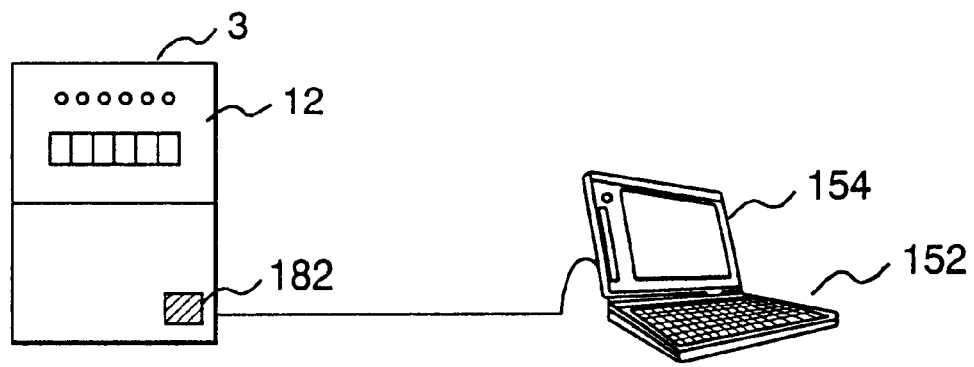
FIG. 10 is a diagram showing the configuration of the protective relay apparatus or the power switchboard when setting the setting values by using the personal computer according to the embodiment of the present invention.

In step S101, a general personal computer (external PC) 152 is connected by using a communication port 182 attached to the protective relay apparatus, as shown in FIG. 10. Thus, the setting value information stored in the memory 14 can be inputted by the external PC 152.

In step S102, the protective relay apparatus shifts to the mode for setting the setting values by key operation. In this case, the mode of the protective relay apparatus shifts by using a keyboard (not shown) or a switch (not shown) arranged to the input section 52 in the protective relay apparatus, alternatively by using a key (not shown) of the personal computer 152.

Figure 11:
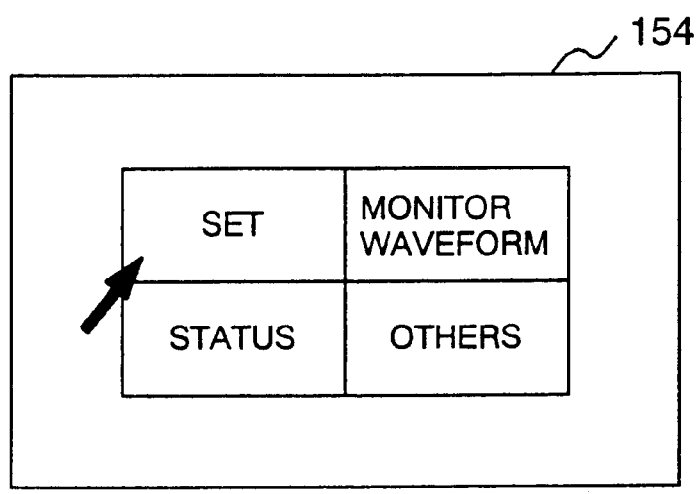
FIG. 11 is a diagram showing one display example of a screen of a personal computer when the setting values by using the personal computer are set, in the protective relay apparatus or the power switchboard according to the embodiment of the present invention.

In step S103, a mouse selects a set icon out of icons indicated on the screen of the personal computer 152 shown in FIG. 11, thus shifting to the set mode for inputting the setting values. Then, data, which indicates that the input circuits A and B use the 600 A-type multi-current transformer, as a 600 A-type wide-range transformer, for general-purpose use and the primary value of the 600 A-type multi-current transformer is 40 [Arms], is inputted on the screen of the personal computer 152 shown in FIG. 12.

In step S104, the inputted setting-values are transmitted in a lump to the memory 14 of the protective relay apparatus by click of a send icon displayed on the screen.

In step S105, after completing the sending of the setting values, a reset icon displayed on the screen, for making the setting values effective is clicked, thus resetting the protective relay apparatus.

The MPU 11 reads the conditions of the setting values, which are stored in the memory 14, and sets the detectable ranges of the input circuits A and B by calculation based on the above-stated arithmetic expressions.

In step S106, the protective relay apparatus is reset from the set mode to the normal operating mode for protection/instrumentation control.

The above-mentioned operations are performed at least once, thereby setting the conditions of the setting values for the input circuits A and B, as setting targets, which share the wide-range transformer for general purpose.

A description is given of input and display examples when setting the setting values of the input circuits A and B in the protective relay apparatus and the power switchboard having the protective relay apparatus of the present invention.

Figure 13:
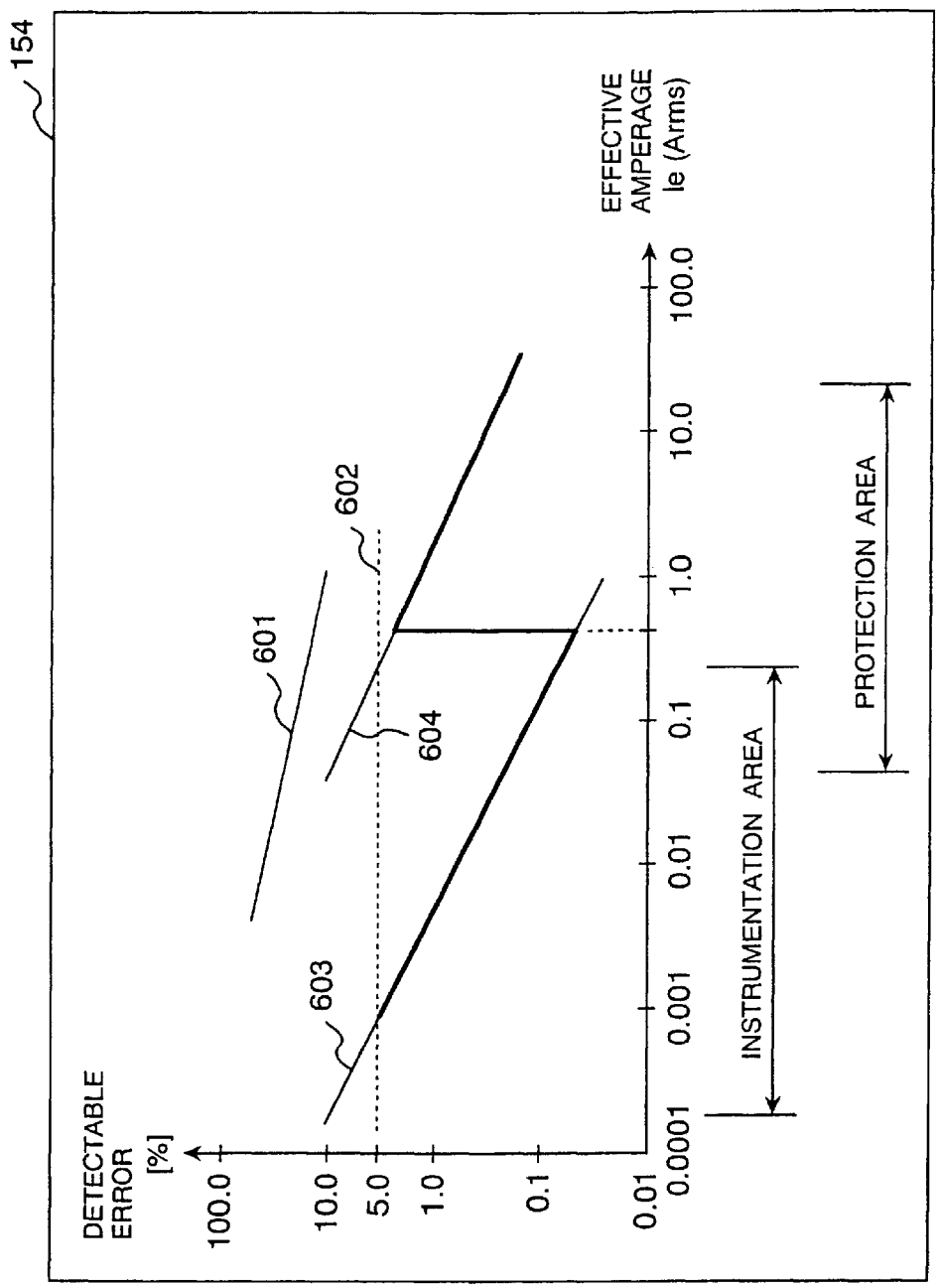
FIG. 13 is a diagram showing one input and display example when setting the setting values of the input circuits under one condition in the protective relay apparatus or the power switchboard having the protective relay apparatus of the present invention.
Figure 14:
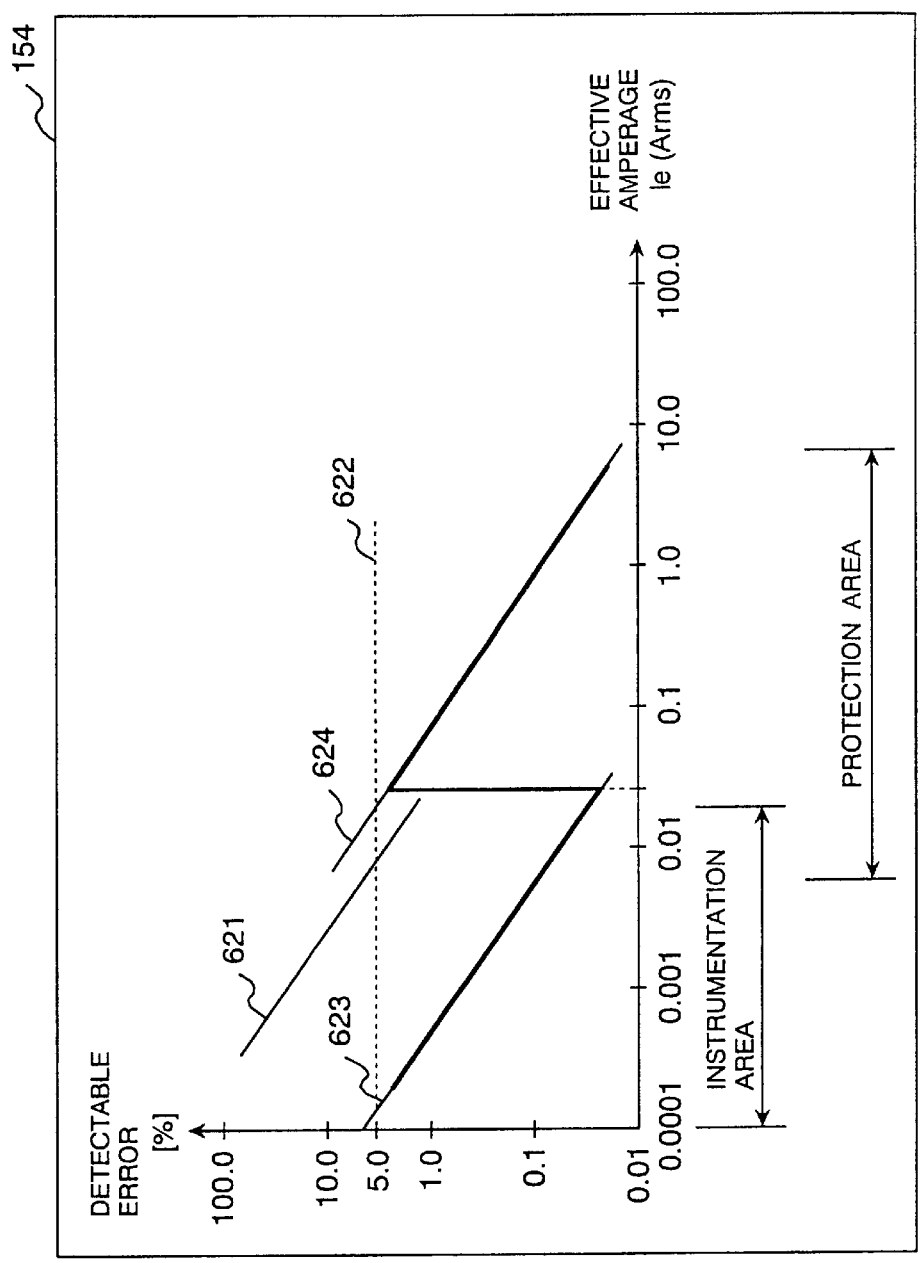
FIG. 14 is a diagram showing another input and display example when setting the setting values of the input circuits under another condition in the protective relay apparatus or the power switchboard having the protective relay apparatus of the present invention.

FIGS. 13 and 14 show graphs for checking to see if the required detection accuracy for protection and instrumentation elements is satisfied within the detectable range set to the input circuits A and B at the switching point of the input circuits A and B. Lines in the graphs of FIGS. 13 and 14 are calculated by the MPU 11 or the personal computer 152 and are displayed on the screen of the LCD provided for the personal computer 152 or the display section 12. When an operator checks the setting values of the input circuits A and B and sets new setting values, lines can be displayed through the input section 52 and the external PC 152.

Display contents of lines in the graphs of FIGS. 13 and 14 will be described by using two examples of the CT primary rated amperages 40 A and 600 A.

FIG. 13 shows a graph when the CT primary rated amperage is 600 A.

A line 601 is figured out by converting a tolerance between the instrumentation ranges of the effective amperage corresponding to the CT primary rated amperage 600 A into an operating value error. In the instrumentation areas of the protective relay apparatus and the power switchboard having the protective relay apparatus of the present invention, error curves of the input circuits A and B should exist below the line 601.

A horizontal dotted line 602 is a reference line indicating 5% as a reference satisfied by the protection element. In the protection area, the error curves of the input circuits A and B should exist below the line 602.

A line 603 shows an error curve within the instrumentation range of the input circuit A. A line 604 shows an error curve within the instrumentation range of the input circuit B.

In the protective relay apparatus and the power switchboard of the present invention, the setting values of the input circuits A and B are determined along a bold line as a condition obtained by combining the lines 603 and 604. The determined setting values of the input circuits A and B satisfy the conditions of the lines 601 and 602.

With respect to the setting values of the input circuits A and B, the input circuit A detects the effective amperages 0.001 to 0.33 [Arms], the switching point from the input circuit A to the input circuit B is set at the effective amperage 0.33 [Arms], and the instrumentation for the effective amperage equal to or more than 0.33 [Arms] is performed by using the input circuit B. The input circuit B detects the effective amperages 0.33 to 26.4 [Arms].

FIG. 14 shows a graph when the CT primary rated amperage is 40 A.

A line 621 is figured out by converting a tolerance between the instrumentation ranges of the effective amperages corresponding to the CT primary rated amperage 40 A into an operating-value error. In the instrumentation areas of the protective relay apparatus and the power switchboard having the protective relay apparatus of the present invention, error curves of the input circuits A and B should exist below the line of the line 621.

Similarly with the line 602 in FIG. 13, a horizontal dotted line 622 is a reference line indicating 5% as a reference satisfied by the protection element. In the protection area, error curves of the input circuits A and B should exist below the line 622.

A line 623 shows an error curve within the instrumentation range of the input circuit A. A line 624 shows an error curve within the instrumentation range of the input circuit B. A absolute condition is that a bold line obtained by combining the lines 623 and 624 satisfies the lines 621 and 622.

When the CT primary rated amperage is 40 A, in the protective relay apparatus and the power switchboard of the present invention, the detectable ranges of the setting values of the input circuits A and B are determined along the bold line as the condition obtained by combining the lines 623 and 624. The determined setting values of the input circuits A and B satisfy the conditions of the graphs 601 and 602.

With respect to the setting values of the input circuits A and B, the input circuit A detects the effective amperages 0.0004 to 0.03 [Arms], the switching point from the input circuit A to the input circuit B is set at the effective amperage 0.03 [Arms], and the instrumentation for the effective amperage equal to or more than 0.03 [Arms] is performed by using the input circuit B. The input circuit B detects the effective amperages 0.03 to 7.0 [Arms].

When an operator checks the setting values of the input circuits A and B and sets new setting values, lines 621 to 624 can be displayed through the input section 52 or the personal computer 152, thus confirming whether or not the current setting values or new setting values of the input circuits A and B are correctly set.

Although the setting values of the input circuits are displayed by using the graphs according to the embodiment of the present invention, the setting values can be displayed in a table format.

Further, although the protective relay apparatus and the power switchboard having no gain control section according to the embodiment of the present invention, obviously, a protective relay apparatus and a power switchboard having a gain control section can be applied to the present invention.

According to the present invention, in the protective relay apparatus or the power switchboard, the relationship between any error of the transformer input circuit and full scale setting is made clear by the arithmetic expressions (1–16). When compatibility with a transformer having several kinds of primary rated current ratios or one kind of primary rated voltage ratio can be achieved by adjusting the parameters of the arithmetic expressions, it is capable of setting the detectable errors of the input circuits to be equal to or less than the reference detectable error.

Further, by dispensing with the gain control section used in the conventional protective relay apparatus and power switchboard, a protective relay apparatus or a power switchboard with high instrumentation accuracy can be realized. Therefore, the number of components, the mounting area and the cost can be reduced.

Furthermore, according to the present invention, in the protective relay apparatus or the power switchboard, by displaying the setting values of the input circuits so that an operator can apparently understand them. Therefore, the setting values of the input circuits can be easily set and checked.

What is claimed is:

1. A protective relay apparatus having a transformer for outputting a detection signal in accordance with varying current or voltage of a main circuit, and a control unit for determining that said main circuit is in a predetermined state by using said detection signal and outputting a control signal for controlling said main circuit, said control unit having two input circuits which share a large range of the detection signal and a small range, respectively, wherein said apparatus comprises:

means for setting two detection ranges which said two input circuits share based on any error of each of said input circuits and permissible errors of protection and instrumentation.

2. A protective relay apparatus according to claim 1, further comprising:

means for displaying a relation between the detection signal and the error corresponding to said two input circuits, respectively.

3. A protective relay apparatus according to claim 2, wherein said display means displays a relation between the detection and the error by graphing.

4. A protective relay apparatus according to claim 1, further comprising:

a plurality of said input circuits, wherein said setting means displays the detection state of said input circuit based on a relationship between the detectable range of said input circuit and a detectable error.

5. A protective relay apparatus according to claim 1, wherein said protective relay apparatus is adopted in a power switchboard to switch on/off said main circuit.

6. A protective relay apparatus according to claim 1, wherein a first one of said input circuits comprises a first operational amplifier for inputting said detection signals and an A/D converter for A/D converting an output signal from said first operational amplifier.

7. A protective relay apparatus according to claim 6, wherein a second one of said input circuits comprises a second operational amplifier for inputting said detection signal and an A/D converter for A/D converting an output signal from said second operational amplifier, said second operational amplifier having gain characteristics compatible with a wide range detection permitting detection in a wide varying range of a current or a voltage, as compared with said first operational amplifier.

* * * * *